July 3, 1934.  R. W. ATKINSON  1,965,540
CABLE INSTALLATION
Filed Jan. 4, 1929  2 Sheets-Sheet 1
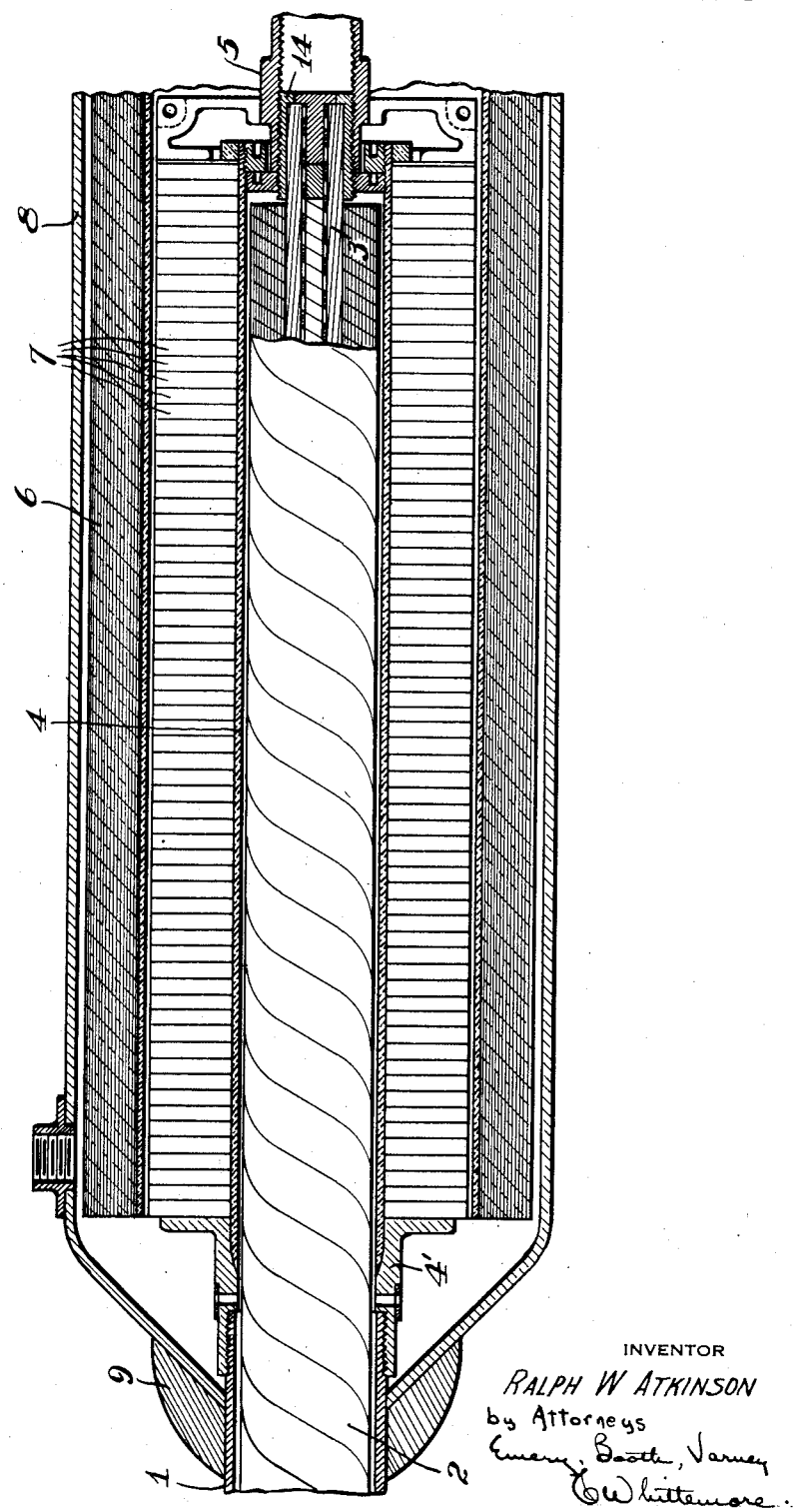
Fig. I.
WITNESS
A B Wallace
INVENTOR
RALPH W ATKINSON
by Attorneys July 3, 1934.  R. W. ATKINSON  1,965,540
CABLE INSTALLATION
Filed Jan. 4, 1929  2 Sheets-Sheet 2
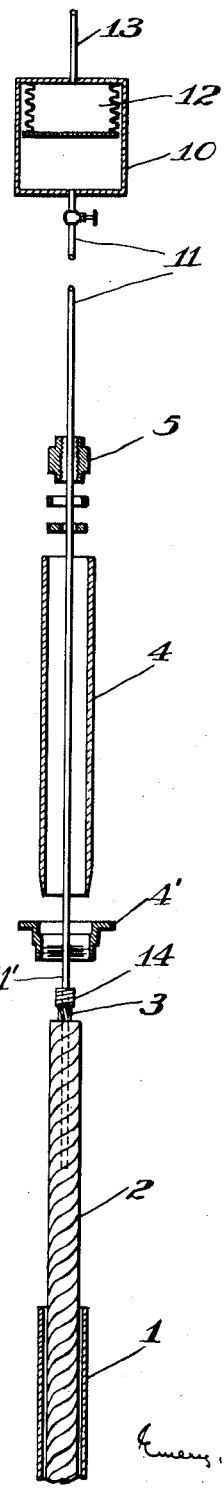
_Fig. II._
WITNESS
A.B.Wallace
INVENTOR
RALPH W ATKINSON
by Attorneys Patented July 3, 1934

1,965,540

UNITED STATES PATENT OFFICE 1,965,540

CABLE INSTALLATION

Ralph W. Atkinson, Perth Amboy, N. J., assignor to General Cable Corporation, New York, N. Y., a corporation of New Jersey Application January 4, 1929, Serial No. 330,347

3 Claims. (Cl. 173—268)

This invention relates generally to the construction and installation of liquid-insulated cables and more particularly to the attachment of joint and terminal structures thereto.

A liquid-insulated cable is one whose conductor, spaced (usually by a body of pervious laminate material) from an impervious surrounding envelope, is immediately enveloped in liquid insulation. Ordinarily the conductor is arranged within and in spaced relation to the surrounding envelope, by being immediately surrounded by a fibrous body, and the liquid insulation penetrates and fills the fibrous body. The fibrous body is usually of laminated character, built of paper tape, and the liquid insulation is usually an oil which at normal operating temperatures is fluid. Herein the term oil-filled cable will be used to designate cables whose conductor is spaced from the sheath and the space filled or flushed with liquid insulating material.

One of the difficulties which hitherto has attended the use of oil-filled cables has been that of attaching terminals and uniting the cable, length to length, as it comes from the factory, without detrimental loss of oil and ingress of air or moisture into the cable insulation. In view of the substantially similar problems attending the attachment of terminals and the formation of joints, particular reference to terminal structures will not be unnecessarily repeated herein.

The lengths of cable as they come from the factory are sealed at the ends, and the operation of jointing includes opening the ends, cutting back sheath and insulation to expose the conductor ends, uniting the so exposed ends of the conductors, and building around the union a body of insulation within a casing which at its ends is united hermetically to the cable sheath on either side of the joint.

The invention will be described in connection with the accompanying drawings wherein Fig. I is a fragmentary view in longitudinal section on an axial plane, of the end of a length of oil-filled cable united electrically to another length within a joint casing, and Fig. II is a diagrammatic view, illustrating a procedure which may be used in producing a joint or terminal, as for example, the joint of Fig. I.

In Fig. I a completed illustrative structure is shown. The sheath 1 and the body of wrapped-on paper insulation 2 have been cut away from the end of a length of cable, exposing the end of the conductor 3. The cable end has been capped by a tubular cap 4, connected in oil-tight union by a bushing 4' with the cable sheath 1 and closed around the conductor end 3. The exposed end of the conductor has been united in the union 5 with the similarly exposed end of the conductor of an adjacent length of cable; the union has been surrounded by a sleeve of insulation 6; stress-distributing elements 7 have been provided; and the whole has been inclosed in a casing 8, which at its ends has been united to the cable sheath by wiped solder joints 9.

Referring to Fig. II, a reservoir 10 containing oil is provided with a suitably proportioned delivery pipe 11. The reservoir may be filled with oil, to the exclusion of air and moisture, and its walls may be made expansible and collapsible. Suitable pressure may be obtained, perhaps by mere elevation of the reservoir above the point where the pipe delivers oil. In this instance, however, the desired end is gained by arranging within a rigid-walled tank 10 an expansible and collapsible chamber 12, and effecting expansion of this chamber by air under pressure, introduced through a feed pipe 13.

When the cable end is opened, communication is established through delivery pipe 11 between oil tank 10 and the body of oil-filled insulation within the cable. In this instance the cable conductor is indicated (Fig. I) to be hollow and formed of stranded wires with interstices between, and the drawing (Fig. II) shows the delivery pipe 11 extending into the hollow core of the cable. Such a situation being established, and the whole being made snug, as the experienced workman will make it, manifestly in place of a draining away of oil from the cable insulation, and a consequent ingress of air, oil will ooze under pressure from the exposed surfaces of insulation, and there will be no ingress of air. For the further protection of the exposed insulation, perforations may be placed in the pipe 11 at the point approximately indicated at 11' just above the cable end, or the pipe 11 may fit loosely in the hollow conductor, to the end that oil will flow down over the outside of the insulation in sufficient quantity to protect the same.

According to my preferred procedure, when the cable end is opened, the sheath and the body of wrapped-on insulation are initially cut back only two or three inches, and a connecting thimble 14 (of Fig. I) is soldered to place upon the exposed conductor end. While this initial procedure is in progress the cable end will preferably be raised, and the escape of oil will at most be slight. When this has been done, the delivery pipe 11 is introduced into the hollow core, as illustrated in Fig. II. Before the introduction of the pipe 11 into the hollow core of the cable, capping members may have been slipped over the pipe; and these, in the particular case illustrated, include the sleeve-like cap body 4, the union member 5, which in the assembly constitutes the closure upon the end of body 4, and the bushing 4'. The cable end may now be moved to horizontal position if necessary, although it is preferred that the cable end be maintained in raised position until the capping is completed.

Under such conditions, while oil is continuously supplied from the reservoir 10, the cable sheath 1 and, if necessary, the body 2 of wrapped-on insulation may be cut back to proper distances, and the cap 4, or other appropriately shaped cap, previously slipped with its fittings to place upon the pipe 11, may be advanced and secured upon the cable end prepared to receive them. Finally, capping having been accomplished, the hollow core space may be plugged as the pipe 11 is withdrawn, thus effectively re-sealing the end of the cable, so that it may be handled in any desired manner in the completion of the joint or terminal. It will be observed that this entire operation has thus been accomplished without appreciable loss of oil from the cable and under conditions which effectively prevent the ingress of air or moisture.

The foregoing description has dealt with a particular preferred form of joint, but obviously may be applied in the building of the other types of joints or terminals for an oil-filled cable. The final closure may be effected by the usual lead sleeve 8 which is connected in oil-tight union at each end to the lead sheaths of the cable lengths. It will of course be understood that in making union of conductors and of lead sleeve to lead sheath, when oil is flowing from the cut end, mechanical union may be employed, as distinguished from the usual sweated union.

It will be understood that the foregoing invention may be variously modified and embodied within the scope of the following claims.

I claim as my invention:

1. The improvement in the art of attaching joint and terminal structures to liquid-insulated cables which consists in raising the end of a cable length, maintaining under pressure the body of liquid within the cable, supplying liquid insulation under pressure to the interior of the cable to form a film over the exposed surface of the cable insulation, and, under such condition, capping the otherwise exposed end of the body of cable insulation.

2. The improvement in the art of attaching joint and terminal structures to liquid-insulated hollow core cables, which consists in raising the end of a length of cable, making connection from an adjacent supply of liquid insulation to the core of such length of cable by a delivery pipe upon which concentric cable-capping elements have been assembled, supplying liquid insulation to the cable through said delivery pipe, removing a portion of the cable sheath, and applying the assembled cable-capping elements in liquid-tight connection with the cable sheath while protecting the otherwise exposed cable insulation by liquid insulation from said reservoir.

3. In the installation of liquid-insulated cable the method of procedure which consists in opening the end of a length of cable and exposing the liquid-filled insulation to conditions of liquid escape, causing a stream of liquid insulation flowing into the cable under pressure through the opened cable end to replace such escaping liquid, and applying liquid-tight closure upon the exposed end of the cable while such escape and replacement continue.

RALPH W. ATKINSON.